United States Patent
Kristensen

(10) Patent No.: US 10,982,652 B2
(45) Date of Patent: Apr. 20, 2021

(54) METHOD FOR CONTROLLING THE PITCH ANGLE OF WIND TURBINE BLADES

(71) Applicant: Siemens Gamesa Renewable Energy A/S, Brande (DK)

(72) Inventor: Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/964,625

(22) PCT Filed: Jan. 22, 2019

(86) PCT No.: PCT/EP2019/051454
§ 371 (c)(1),
(2) Date: Jul. 24, 2020

(87) PCT Pub. No.: WO2019/149568
PCT Pub. Date: Aug. 8, 2019

(65) Prior Publication Data
US 2021/0054823 A1   Feb. 25, 2021

(30) Foreign Application Priority Data

Jan. 31, 2018 (EP) .................... 18154439

(51) Int. Cl.
*F03D 9/00* (2016.01)
*H02P 9/04* (2006.01)
(Continued)

(52) U.S. Cl.
CPC ........... *F03D 7/0224* (2013.01); *F03D 17/00* (2016.05); *F05B 2260/42* (2013.01); *F05B 2260/70* (2013.01)

(58) Field of Classification Search
CPC .... F03D 7/0224; F03D 17/00; F05B 2260/42; F05B 2260/70
See application file for complete search history.

(56) References Cited

U.S. PATENT DOCUMENTS 4,584,486 A * 4/1986 Quynn ................... F03D 7/0224
290/44
2007/0057517 A1* 3/2007 McNerney ............ F03D 7/0224
290/44
(Continued)

FOREIGN PATENT DOCUMENTS

EP        2589800 A1    5/2013
WO    2016174233 A1   11/2016

OTHER PUBLICATIONS

International Search Report and Written Opinion in corresponding PCT Patent Application No. PCT/EP2019/051454 dated Apr. 23, 2019. 12 pages.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A method for controlling the pitch angle of the blades including the following steps of: measuring an energy storage of the blades pitch actuation system at predefined values of a first blade pitch angle interval; comparing the measured values of the energy storage of the blades pitch actuation system with a predefined minimum value of the energy storage; if the measured values of the energy storage are all greater or equal than the predefined minimum value of the energy storage then enabling normal operation; if at least one of the measured values of the energy storage are lower than the predefined minimum value then: calculating a third pitch angle calculating a third blade pitch angle interval
(Continued)

extending between a fourth pitch angle and the second pitch angle; and limiting the blades pitch actuation system to operate only in the third pitch angle interval.

7 Claims, 3 Drawing Sheets

(51) Int. Cl.
  *F03D 7/02* (2006.01)
  *F03D 17/00* (2016.01)

(56) References Cited

U.S. PATENT DOCUMENTS

| | | | |
|---|---|---|---|
| 2009/0295159 A1* | 12/2009 | Johnson | G05B 13/024 290/44 |
| 2010/0133818 A1* | 6/2010 | Kinzie | F03D 7/0296 290/44 |
| 2010/0301606 A1* | 12/2010 | Hashimoto | F03D 7/046 290/44 |
| 2012/0087792 A1 | 4/2012 | Cousineau et al. | |

OTHER PUBLICATIONS

International Preliminary Report on Patentability in corresponding PCT Patent Application No. PCT/EP2019/051454 dated Jan. 8, 2020. 11 pages.

Extended European Search Report in corresponding European Patent Application No. 18154439.6 dated Jul. 17, 2018. 6 pages.

* cited by examiner

METHOD FOR CONTROLLING THE PITCH ANGLE OF WIND TURBINE BLADES

CROSS-REFERENCE TO RELATED APPLICATIONS

This application claims priority to PCT Application No. PCT/EP2019/051454, having a filing date of Jan. 22, 2019, which is based off of European Patent Application No. 18154439.6, having a filing date of Jan. 31, 2018, the entire contents both of which are hereby incorporated by reference.

FIELD OF TECHNOLOGY

The following relates to a method for controlling the pitch angle of the blades of a wind turbine.

BACKGROUND

Normally, any wind turbine is provided with a pitch actuation system (either electric or hydraulic) for regulating the pitch angle of each blade, i.e. the angular position of each blade about the respective blade longitudinal axis. The pitch angle defines the angle of attack of the blades in relationship to the direction of the wind to control the production of power of the wind turbine.

The pitch actuation system of a wind turbine is provided with energy stored for emergency shutdown of the turbine. On a regular basis, the capacity of this energy storage must be checked. The capacity may be defined in terms of power or torque needed to rotate the blade about the respective blade longitudinal axis.

The capacity of the pitch actuation system must be sufficient to pitch all blades (or the individual blade if each blade is equipped with a separate energy storage system) under all known wind load cases, from the most aggressive pitch angle to the least aggressive pitch angle, respectively referring to the pitch angle at which the production of power of the wind turbine reaches a maximum value and the pitch angle at which the production of power of the wind turbine reaches a minimum value or no power at all is produced from the wind turbine. According to that, the latter condition is commonly referred to as "idle" or "fully feathered".

If the capacity, compared with a required predefined potential for starting the emergency shut down, is insufficient according to the above, the wind turbine is shut down until capacity of the pitch actuation system can be re-established, e.g. via service inspection or replacement of defective components. For example, accumulators may have to be replaced or regenerated on site by service crews.

The approach is that the turbine is not safe to operate if, under any circumstances, the pitch actuation system cannot overcome all and any wind load starting from any pitch position. However, during the service time needed for the re-establishment of the capacity of the pitch actuation system, the wind turbines is not operative, costing significant number of production hours.

It is therefore still desirable to provide a new method for controlling the pitch angle of the blades of a wind turbine, limiting the shutdowns of the wind turbine without compromising the safety of operations.

SUMMARY

An aspect relates to a method for controlling the pitch angle of the blades of a wind turbine is provided.

According to an aspect of the present invention, a method for controlling the pitch angle of the blades of a wind turbine comprises the following sequence of steps:

measuring an energy storage of the blades pitch actuation system at predefined values of a first blade pitch angle interval extending between a first pitch angle and a second pitch angle;

comparing the measured values of the energy storage of the blades pitch actuation system with a predefined minimum value of the energy storage;

if the measured values of the energy storage are all greater or equal than the predefined minimum value of the energy storage then enabling operation of the blades pitch actuation system for the entire first blade pitch angle interval;

if at least one of the measured values of the energy storage are lower than the predefined minimum value of the energy storage then:

calculating a third pitch angle at which the energy storage equals the predefined minimum value and a second blade pitch angle interval extending between the first pitch angle and the third pitch angle;

calculating a third blade pitch angle interval extending between a fourth pitch angle and the second pitch angle, the difference between the energy storage at the fourth pitch angle and the energy storage at the second pitch angle being the same of the difference between the energy storage at the first pitch angle and the predefined minimum value of the energy storage; and limiting the blades pitch actuation system to operate only in the third blade pitch angle interval.

According to embodiment of the present invention, the capacity for emergency shut down is considered as a continuum by identifying the pitch angle interval within which the turbine can operate safely, i.e. the third blade pitch angle interval, rather than the entire first blade pitch angle interval.

The second pitch angle may correspond to the least aggressive pitch angle (idle condition).

The third blade pitch angle interval is defined as an angle interval extending between the fourth pitch angle and the second angle ("idle"). The fourth pitch angle is calculated as the pitch angle which provides a predefined minimum level of stored energy at "idle" condition. More specifically, such predefined minimum level of stored energy equals the difference between the energy storage at the first pitch angle (most aggressive pitch angle) and the predefined minimum value of the energy storage.

Advantageously, this allows the turbine to remain in operation at reduced output, increasing availability and AEP (Annual Electricity Produced).

In particular, according to a possible embodiment of the present invention, the third blade pitch angle interval may have the same angular extension of the second blade pitch angle interval.

In this embodiment, the third blade pitch angle interval corresponds to the second blade pitch angle interval shifted to cover a portion of the total first blade pitch angle interval extending up to the second pitch angle.

According to exemplary embodiments of the present invention, depending on the chosen positive orientation of the pitch angles about the longitudinal axis of the blade, the first pitch angle is lower than the second pitch angle and the fourth pitch angle is calculated as difference between the second pitch angle and the third pitch angle or, alternatively, the first pitch angle is greater than the second pitch angle and the fourth pitch angle is calculated as difference between the third pitch angle and the second pitch angle.

The first blade pitch angle interval may extend from a most aggressive pitch angle to a least aggressive pitch angle. Expressions such as "most aggressive" and "least aggressive" are defined in relationship to wind conditions at a wind turbine location.

The predefined minimum value of the energy storage may be defined as a required energy potential at the least aggressive pitch angle.

According to other exemplary embodiment of the present invention, the method of the present invention further comprises the step of notifying a user that the step of limiting the blades pitch actuation system to operate only in the third blade pitch angle interval is executed.

This may permit, for example, service technicians to plan the re-establishment of the entire capacity of the pitch actuation system when the loss of AEP (Annual Electricity Produced) is minimized.

BRIEF DESCRIPTION

Some of the embodiments will be described in detail, with reference to the following figures, wherein like designations denote like members, wherein.

DETAILED DESCRIPTION

Figure 1:
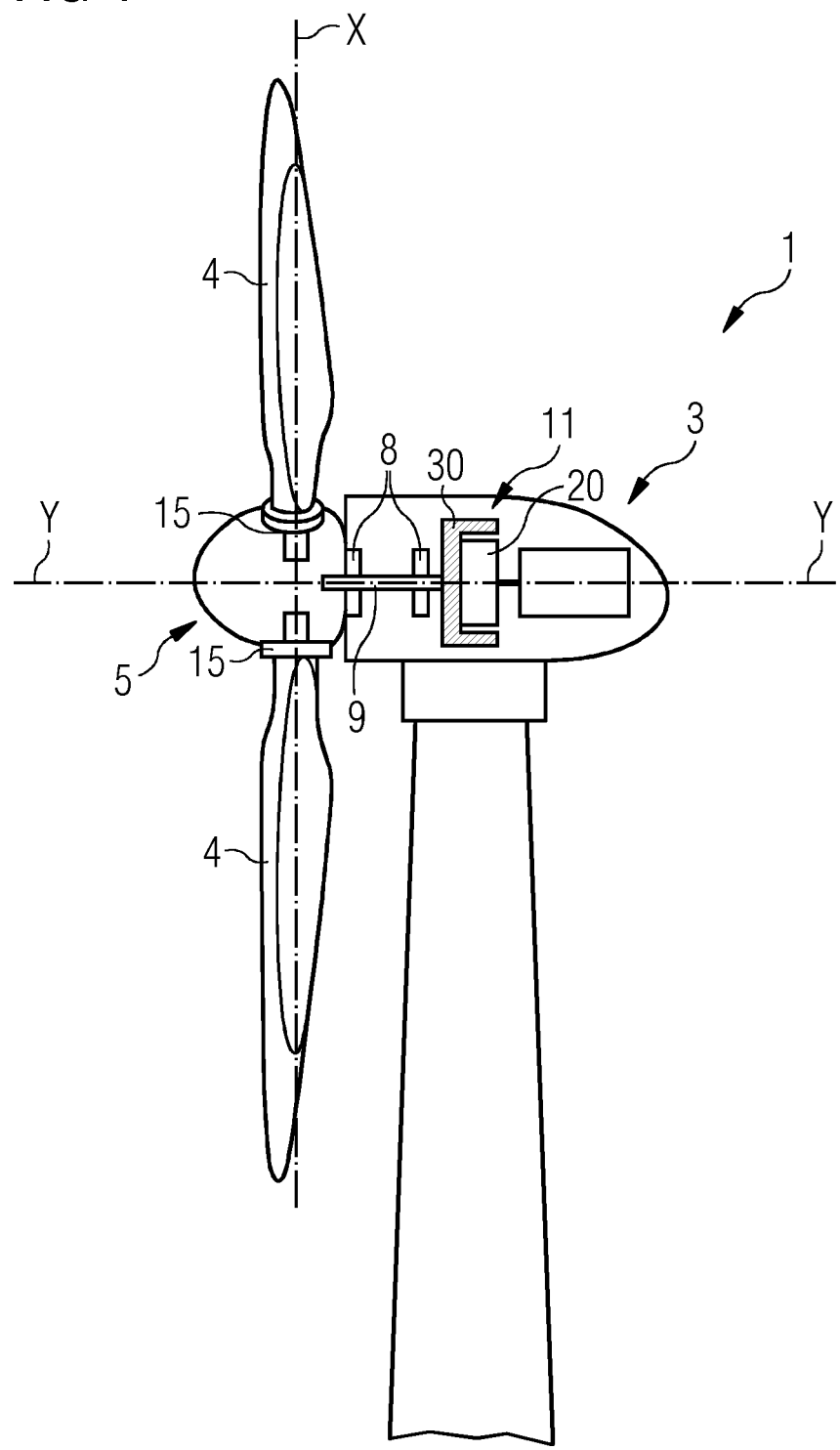
FIG. 1 depicts a schematic section of a wind turbine to which the method can be applied.

The illustrations in the drawings are schematic. It is noted that in different figures, similar or identical elements are provided with the same reference signs.

FIG. 1 shows a wind turbine 1 according to embodiments of the present invention. The wind turbine 1 comprises a tower 2, which is mounted on a non-depicted foundation. A nacelle 3 is arranged on top of the tower 2.

The wind turbine 1 further comprises a wind rotor 5 having at least one blade 4 (in the embodiment of FIG. 1, the wind rotor comprises three blades 4, of which only two blades 4 are visible). The wind rotor 5 is rotatable around a rotational axis Y.

The blades 4 extend substantially radially with respect to the rotational axis Y and along a respective longitudinal axis X.

The wind turbine 1 comprises an electric generator 11, including a stator 20 and a rotor 30. The rotor 30 is rotatable with respect to the stator 20 about the rotational axis Y.

The wind rotor 5 is rotationally coupled with the electric generator 11 either directly, e.g. direct drive or by means of a rotatable main shaft 9 and/or through a gear box (not shown in FIG. 1). A schematically depicted bearing assembly 8 is provided in order to hold in place the main shaft 9 and the rotor 5. The rotatable main shaft 9 extends along the rotational axis Y.

The wind rotor 5 comprises three flanges 15 for connecting a respective blade 4 to the wind rotor 5. A pitch bearing is interposed between each blade flange 15 and the respective blade 4. A pitch actuation system (either electric or hydraulic) is associated to the pitch bearings of the blades 4 for regulating the pitch angle of each blade, i.e. the angular position of each blade about the respective blade longitudinal axis X.

According to the different possible embodiments of the present invention, one single pitch actuation system may be provided for all blades 4 or a plurality of pitch actuation systems may be provided, each serving one respective blade 4.

Figure 2:
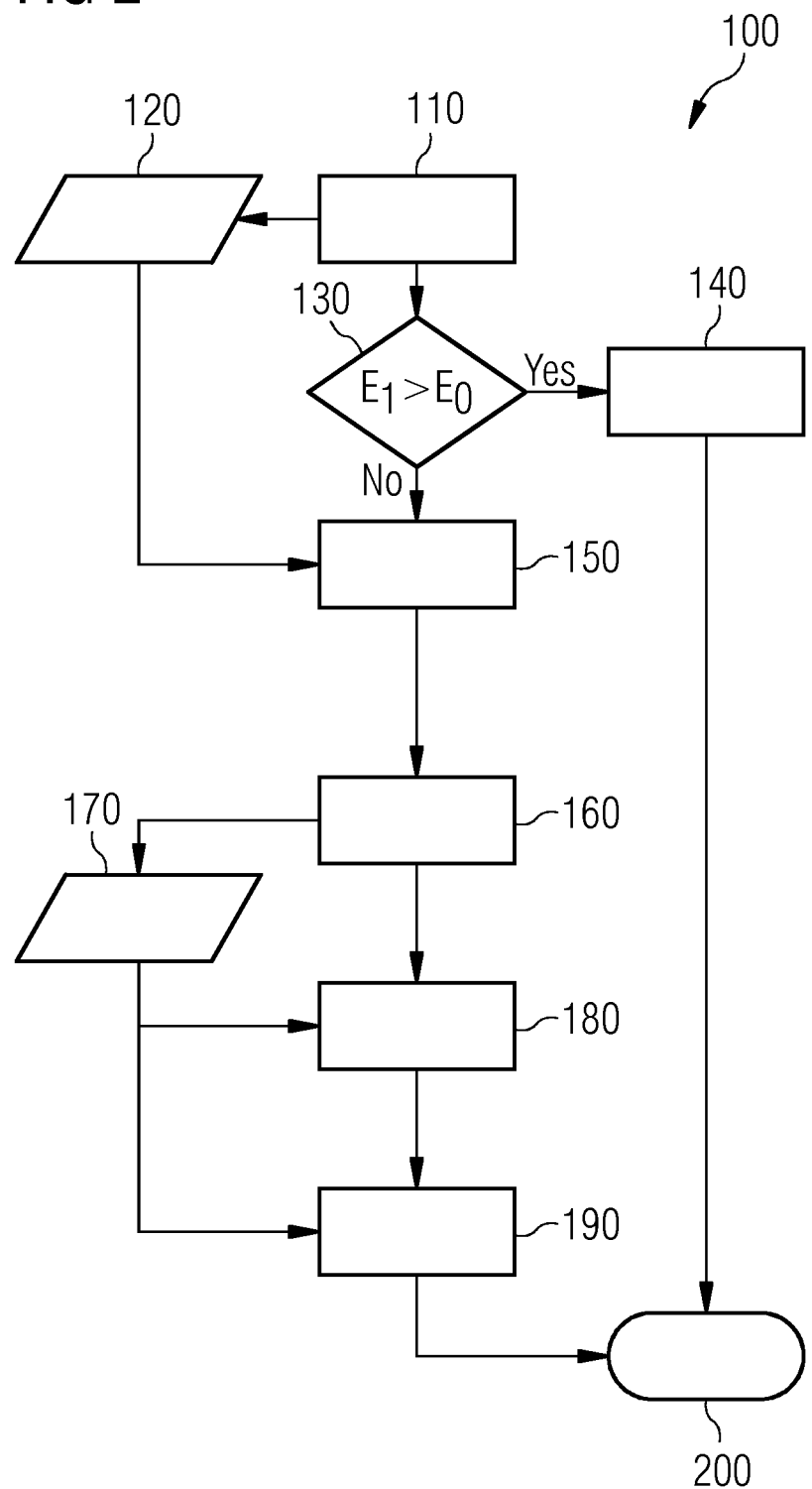
FIG. 2 depicts a block diagram, illustrating the method.

With reference to the block diagram of FIG. 2, a method 100 for controlling the pitch angle of the blades 4 is described.

Figure 3:
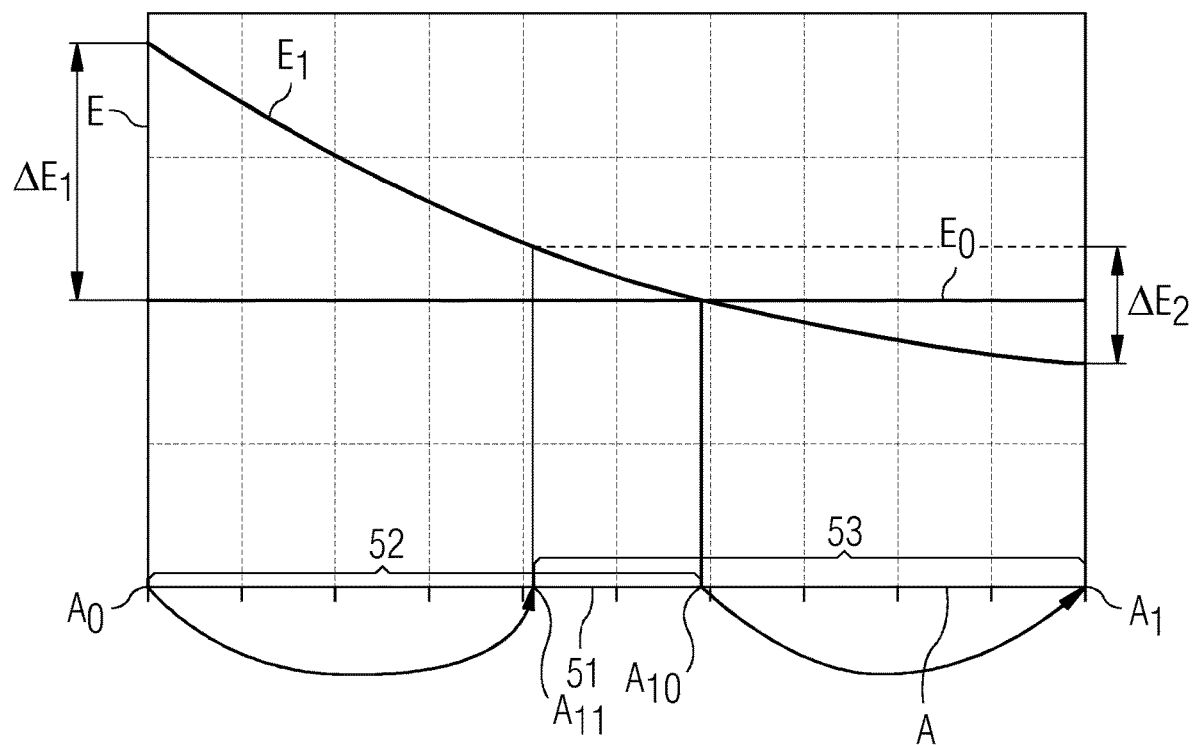
FIG. 3 depicts a first graph, illustrating some steps of the method of FIG. 2.

With reference to the graph of FIG. 3, the results obtained by execution of the method 100 are displayed. In the graph of FIG. 3, the abscissa axis A represents a pitch angle extending between a first pitch angle A0 ("most aggressive pitch angle) and a second pitch angle A1 ("least aggressive pitch angle). The ordinate axis E represents the energy stored in the actuation system.

The method 100 comprises a first step 110 of measuring energy storage E1 of the blades pitch actuation system at predefined values of a first blade pitch angle interval 51 extending between the first pitch angle A0 and the second pitch angle A1. The result of the first step 110 is shown in the graph of FIG. 3, where the measured energy storage E1 is represented by curve decreasing from the first pitch angle A0 to the second pitch angle A1.

The first pitch angle A0 represents the most aggressive pitch angle, i.e. the pitch angle at which the production of power of the wind turbine reaches a maximum value. The second pitch angle A1 represents the least aggressive pitch angle, i.e. the pitch angle at which the production of power of the wind turbine reaches a minimum value or no power at all is produced from the wind turbine. The condition corresponding to the second pitch angle A1 is referred to as "idle" or "fully feathered".

According to a first exemplary embodiment of the present invention, the positive orientation of the pitch angles about the longitudinal axis of the blade is chosen in such a way that the first pitch angle A0 is lower than the second pitch angle A1.

According to a second exemplary embodiment of the present invention, the positive orientation of the pitch angles about the longitudinal axis of the blade is opposite with respect to the previous one and therefore the first pitch angle A0 is greater than the second pitch angle A1.

Parallel to the first step 110, the method 100 comprises a second step 120 of reading and recording the measured energy storage E1 of the blades pitch actuation system at predefined values of the first blade pitch angle interval 51.

After the first step 110, the method 100 comprises a third step 130 of comparing the measured values E1 of the energy storage of the blades pitch actuation system with a predefined minimum value E0 of the energy storage.

Such minimum value E0 of the energy storage is predefined as a required energy potential at the least aggressive pitch angle, i.e. at the second pitch angle A1.

If the measured values E1 of the energy storage are all greater or equal than the predefined minimum value E0 of the energy storage, then after the third step 130 the method 100 comprises a fourth step 140 of enabling operation of the blades pitch actuation system for the entire first blade pitch angle interval 51.

After the fourth step 140, the method 100 is terminated in the final step 200 of exiting the method 100 and returning to operation of the wind turbine 1.

If at least one of the measured values E1 of the energy storage is lower than the predefined minimum value E0 of the energy storage, then after the third step 130 the method 100 comprises a fifth step 150 of calculating a third pitch angle A10 at which the energy storage equals the predefined minimum value E0 and a second blade pitch angle interval 52 extending between the first pitch angle A0 and the third pitch angle A10. For the performing of such calculation the fifth step 150 receives as input the values of E1 recorded during the second step 120.

If at least one of the measured values E1 of the energy storage is lower than the predefined minimum value E0 of the energy storage, then after the fifth step 150 the method 100 comprises a sixth step 160 of calculating a third blade pitch angle interval 53 extending between a fourth pitch angle A11 and the second pitch angle A1.

The fourth pitch angle A11 is determined in such a way that the difference ΔE2 between the energy storage E1 at the fourth pitch angle A11 and the energy storage at the second pitch angle A1 equals the difference ΔE1 between the energy storage E1 at the first pitch angle A0 and the predefined minimum value E0 of the energy storage.

According to a possible embodiment of the present invention, the third blade pitch angle interval 53 has the same angular extension of the second blade pitch angle interval 52.

In practice, as graphically illustrated in FIG. 3, the third blade pitch angle interval 53 corresponds to the second blade pitch angle interval 52 shifted up to cover a portion of the first blade pitch angle interval extending up to reaching the second pitch angle and started from a fourth pitch angle A11.

According to the first exemplary embodiment of the present invention, where the first pitch angle A0 is lower than the second pitch angle A1, the fourth pitch angle A11 is the difference between the second pitch angle A1 and the third pitch angle A10.

According to the second exemplary embodiment of the present invention, where the first pitch angle A0 is greater than the second pitch angle A1, the fourth pitch angle A11 is the difference between the third pitch angle A10 and the second pitch angle A1.

Parallel to the sixth step 160, the method 100 comprises a seventh step 170 of reading and recording the fourth pitch angle A11.

If at least one of the measured values E1 of the energy storage is lower than the predefined minimum value E0 of the energy storage, then after the sixth step 160 the method 100 comprises a eighth step 180 of limiting the blades pitch actuation system to operate only in the third blade pitch angle interval 53. The values of pitch angles comprised between the first pitch angle A0 and the fourth pitch angle A11 will be excluded from operations and the blades pitch actuation system will operate in order not to reach the pitch angles comprised between the first pitch angle A0 and the fourth pitch angle A11. In practice, after the eighth step 180 is performed, the fourth pitch angle A11 represents a new and acceptable value for the most aggressive pitch angle, which was previously represented by the first pitch angle A0.

Optionally, after the eighth step 180, the method 100 may include a ninth step 190 of notifying a user that the step of limiting the blades pitch actuation system to operate only in the third blade pitch angle interval 53 is executed.

After the eighth step 180 or, optionally, after the ninth step 190, the method 100 is terminated in the final step 200 of exiting the method 100 and returning to operation of the wind turbine 1 (in the limited third blade pitch angle interval 53).

The present invention assures that in all cases, also when the limited third blade pitch angle interval 53 is operated, the blades can reach the "idle" condition, thus providing the required level of safety.

By allowing safe operation of the turbine also in the limited third blade pitch angle interval 53 and not only in the complete first blade pitch angle interval 51, the present invention limits the shut downs of the wind turbine 1 and provides an efficient method for increasing the AEP (Annual Electricity Produced).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method for controlling pitch angle of blades of a wind turbine, the method comprising:
    measuring an energy storage value of a blades pitch actuation system at predefined values of a first blade pitch angle interval extending between a first pitch angle and a second pitch angle;
    comparing the measured values of the energy storage of the blades pitch actuation system with a predefined minimum value of the energy storage;
    if the measured values of the energy storage are all greater or equal than the predefined minimum value of the energy storage then enabling operation of the blades pitch actuation system for an entire first blade pitch angle interval;
    if at least one of the measured values of the energy storage is lower than the predefined minimum value of the energy storage then:
    calculating a third pitch angle at which the energy storage value equals the predefined minimum value and a second blade pitch angle interval extending between the first pitch angle and the third pitch angle calculating a third blade pitch angle interval extending between a fourth pitch angle and the second pitch angle, a difference between the energy storage value at the fourth pitch angle and the energy storage at the second pitch angle being the same of a difference between the energy storage value at the first pitch angle and the predefined minimum value of the energy storage; and
    limiting the blades pitch actuation system to operate only in the third blade pitch angle interval.

2. The method according to claim 1, wherein the third blade pitch angle interval has a same angular extension of the second blade pitch angle interval.

3. The method according to claim 1, wherein the first pitch angle is lower than the second pitch angle and the fourth pitch angle is calculated as a difference between the second pitch angle and the third pitch angle.

4. The method according to claim 1, wherein the first pitch angle is greater than the second pitch angle and the fourth pitch angle is calculated as a difference between the third pitch angle and the second pitch angle.

5. The method according to claim 1, further comprising notifying a user that limiting the blades pitch actuation system to operate only in the third blade pitch angle interval is executed.

6. The method according to claim 1, wherein the first blade pitch angle interval extends from a most aggressive pitch angle to a least aggressive pitch angle in relationship to wind conditions at a wind turbine location.

7. The method according to claim 6, wherein the predefined minimum value of the energy storage is defined as a required energy potential at the least aggressive pitch angle.

* * * * *